United States Patent [19]

Massara et al.

[11] Patent Number: 5,562,324
[45] Date of Patent: Oct. 8, 1996

[54] LUMBAR SUPPORT ACTUATION

[75] Inventors: Andrew J. Massara, Southfield; John Wainwright, Riverview, both of Mich.

[73] Assignee: Lear Seating Corporation, Southfield, Mich.

[21] Appl. No.: 595,671

[22] Filed: Feb. 2, 1996

[51] Int. Cl.⁶ .................................................. A47C 7/46
[52] U.S. Cl. .................................... 297/284.6; 297/452.41
[58] Field of Search ........................... 297/284.4, 284.5, 297/284.6, 452.41

[56] References Cited

U.S. PATENT DOCUMENTS

| | | |
|---|---|---|
| 3,326,601 | 6/1967 | Vanderbilt et al. ................. 297/284.6 |
| 3,330,598 | 7/1967 | Whiteside et al. . |
| 3,983,640 | 10/1976 | Cardullo et al. ................. 297/284.6 X |
| 4,634,179 | 1/1987 | Hashimoto et al. . |
| 4,699,424 | 10/1987 | Andres et al. . |
| 4,746,168 | 5/1988 | Bracesco . |
| 4,807,931 | 2/1989 | Ishida et al. . |
| 5,082,326 | 1/1992 | Sekido et al. ....................... 297/284.6 |
| 5,135,282 | 8/1992 | Pappers . |
| 5,137,329 | 8/1992 | Neale ................................. 297/284.6 |

FOREIGN PATENT DOCUMENTS

| | | | |
|---|---|---|---|
| 128534 | 12/1984 | European Pat. Off. ............ 297/284.6 |
| 267348 | 12/1968 | Germany ........................... 297/284.6 |
| 2626277 | 12/1977 | Germany ........................... 297/284.6 |

*Primary Examiner*—Peter R. Brown
*Attorney, Agent, or Firm*—Howard & Howard

[57] ABSTRACT

A seat (10) including a backrest portion (16) with seat back support (24) providing selective lumbar support to a user. The seat back support (24) includes a pair of clam-shell shaped air bladders (28, 30) with their movable, expanding ends (36, 38) facing one another. Divider members (42, 44) split each of the bladders (28, 30) into separate side-by-side air sections to maintain the clam-shell shape of the bladders (28, 30) preventing bowing in the center of the seat back (14). The bladders (28, 30) support and move a flexible plate (70) connected thereover to provide selective contoured adjustment to the lumbar region of a user.

6 Claims, 2 Drawing Sheets

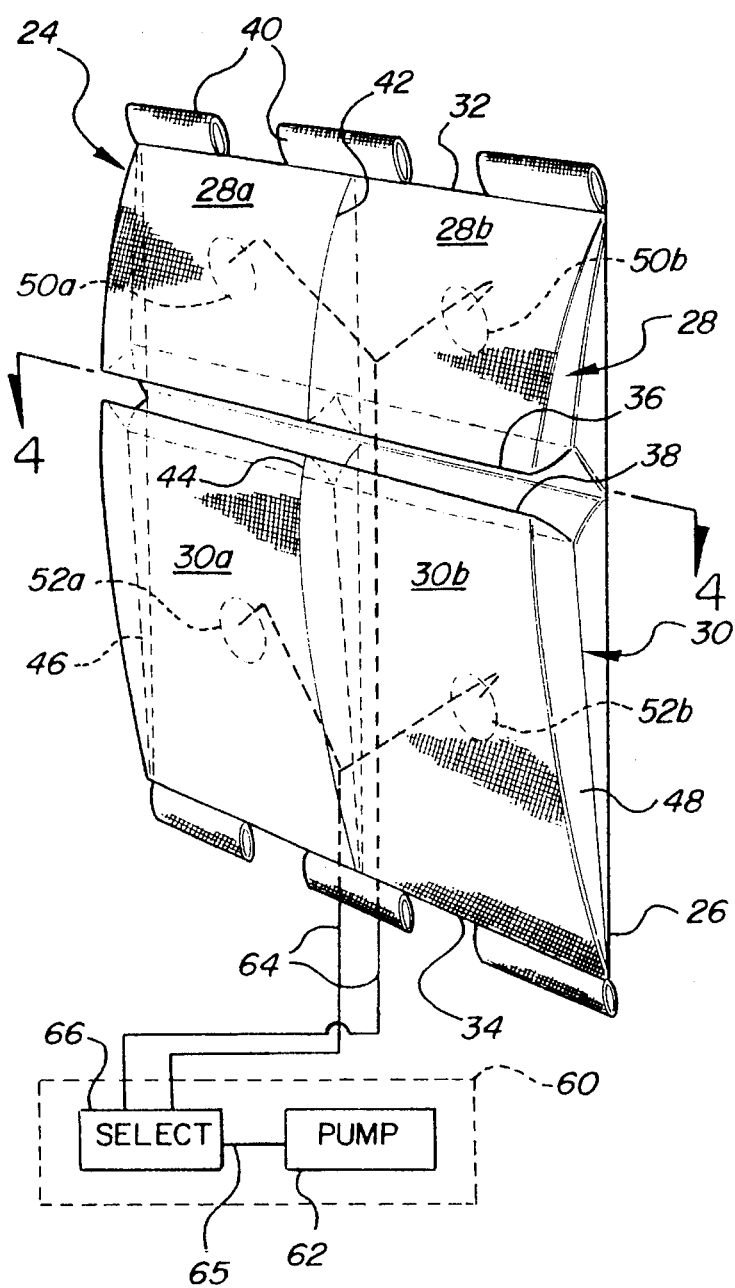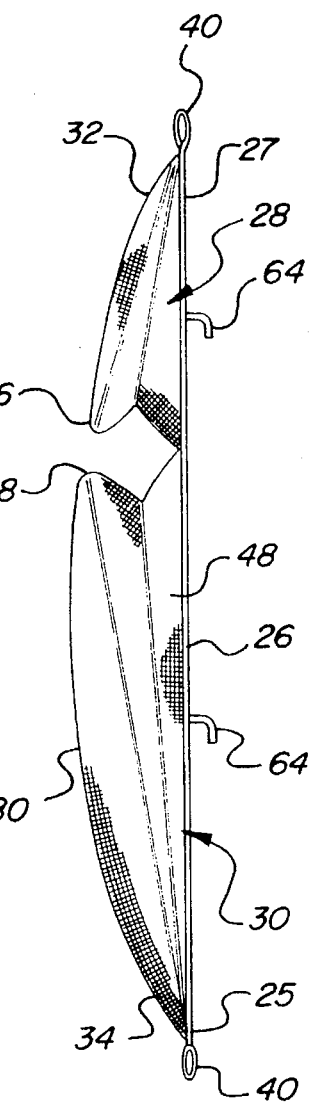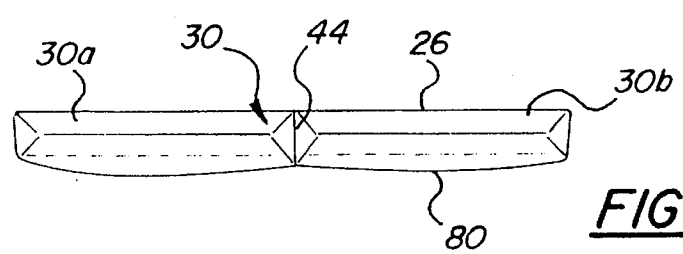

LUMBAR SUPPORT ACTUATION

TECHNICAL FIELD

The invention relates to the selective contour adjustment for use in the backrest of a seat, and more particularly, to adjustable lumbar and thoracic support in a vehicle seat.

BACKGROUND OF THE INVENTION

Lumbar support assemblies are used for maintaining a seat cushion in a contoured position. Such lumbar support assemblies usually include either bellows or air bladders and a pump to force air into the cushion pocket until a desired contour is reached. A semi-rigid mechanical structure, which can be moved in a plurality of predetermined positions to adjust the contour of the seat in the lumbar area, is also known.

U.S. Pat. No. 5,076,643, issued Dec. 31, 1991 in the name of Colasanti et al, and assigned to the assignee of the subject invention, discloses a lumbar support assembly having a seat frame with a pneumatic bladder supported thereon. A contoured plate is disposed over the bladder having a free end slidably engaged with guides. As the bladder is inflated and deflated, the plate responds thereto providing lumbar support as required.

U.S. Pat. No. 5,137,329, issued Aug. 11, 1992 in the name of Neale discloses a lumbar support mechanism having an actuator located behind a rigid plate. An upper chamber and a lower chamber are located within the actuator. The chambers are expandable and inflate independently of each other. As the actuator inflates either or both of the chambers, the plate moves to provide the desired lumbar support.

U.S. Pat. No. 5,082,326, issued Jan. 21, 1992 in the name of Sekido et al discloses a vehicle seat having a number of inflatable bladders used for comfort control adjustment. A clam-shell shaped air bladder is disclosed. Furthermore, U.S. Pat. No. 3,326,601, issued Jun. 20, 1967 in the name of Vanderbilt et al discloses the use of a clam-shaped air bladder.

A problem with the prior art is that such air bladders tend to cause uneven distribution of air pressure in the lumbar area, i.e., the bags tend to bow in the center providing uneven support of the plate.

SUMMARY OF THE INVENTION

The invention is a seat back assembly for selectively providing support to a user in a seat back of a seat. The assembly includes a support member adapted to be connected to a seat back of a seat. A pair of vertically spaced expansion members are secured to the support member. At least one of the expansion members comprises a clam-shelled shaped bladder for receiving and containing air which includes a first end connected to the support member providing a hinge point. A second end is vertically spaced from the first end and is movable through a variable distance from the support member to provide selective support to a user. A controller is connected to the expansion members to provide selective expansion of the expansion members and support to a user. The assembly is characterized by the bladder including a divider member establishing at least two horizontally located separate air sections of the bladder preventing air from passing between the separate air sections through the divider member.

The advantages is that the separate sections prevent bulging in the center of the air bladder by maintaining the desired clam-shell shape and providing even support in the lumbar area, and for vertical adjustment of the lumbar apex.

FIGURES IN THE DRAWINGS

Other advantages of the present invention will be readily appreciated as the same becomes better understood by reference to the following detailed description when considered in connection with the accompanying drawings wherein:

FIG. 2 is a perspective view of the support member;

FIG. 3 is a side view of the support member; and

FIG. 4 is a top view of the support member taken along lines 4—4 of FIG. 2.

DESCRIPTION OF THE PREFERRED EMBODIMENT

Figure 1:
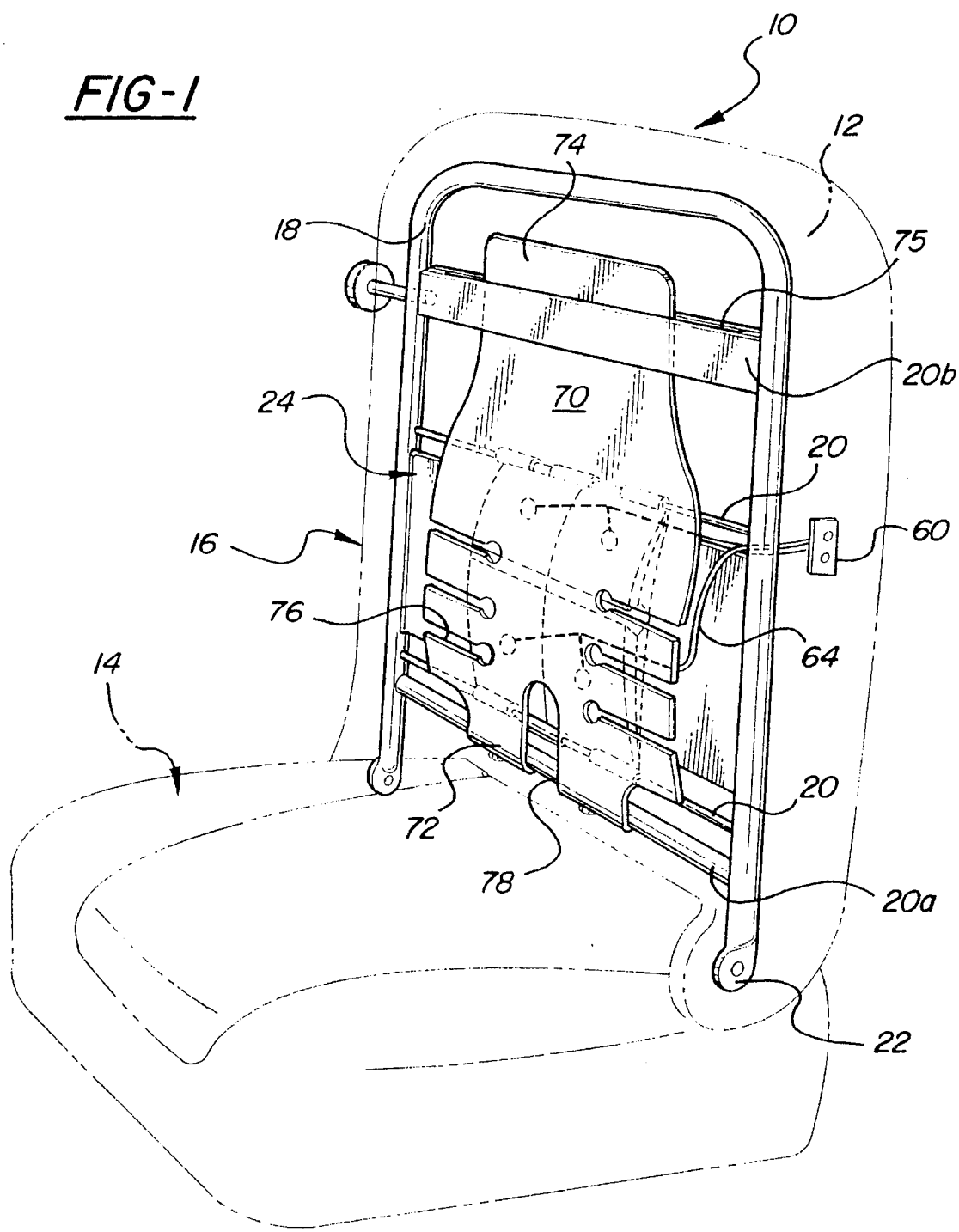
FIG. 1 is a perspective view of a seat using the subject invention.

A seating assembly 10 for supporting a seat cushion 12 is generally illustrated in FIG. 1. The setting assembly 10 generally includes a seating portion 14 and a backrest or seat back portion 16. The seating portion 14 and backrest portion 16 are operatively connected to one another to form the seating assembly 10 with the seat cushion 12 thereover. Such seating assembly 10 is generally utilized in a motor vehicle and may be mounted in a vehicle as commonly known in the art; however, it is to be understood that other applications are within the scope of the art.

The backrest portion 16 of the seating assembly 10 generally includes a seat back frame 18 for supporting the seat cushion 12 and occupant. The seat back frame 18 comprises a generally U-shaped rigid frame of suitable contour of the backrest portion 16. The seat back frame 18 also includes a plurality of cross bars 20 connected across the seat back frame 18 for further support thereof. The lower end 22 of the frame 18 is connected to the seating portion 14 in a manner commonly known in the art. The cross bars 20 may be either welded or otherwise fixedly connected to the frame 18 as commonly known in the art.

The seating assembly 10 includes a seat back support assembly 24 for selectively providing support to a user through the seat back 16 of the seating assembly 10. The seat back support assembly 24 is generally connected to and supported by the seat back frame 18. Such seat back support assembly 24 provides selective lumbar support.

The seat back support assembly 24 includes a support member 26 adapted to be connected to the seat back frame 18 of the seat back portion 16. The support member 26 is generally a flexible rubber backing sheet of generally rectangular configuration.

The longitudinal 25, 27 ends of the support member 26 include a plurality of fastener loops 40 extending outwardly therefrom to allow securement to the seat back frame 18, or other structural member of the seat back portion 16, such as the cross bars 20.

The seat back support assembly 24 includes a pair of vertically spaced expansion members 28, 30. Each of the expansion members 28, 30 comprise a clam-shell shaped air bladder for receiving and containing air. The air bladders 28, 30 are fixedly secured to the support member 26 to expand outwardly therefrom while being supported by the frame 18. The air bladders 28, 30 include first longitudinal ends 32, 34 connected to the support member 26 providing a hinge point. The longitudinal ends 32, 34 are at the same location as the longitudinal ends 25, 27 of the support member 26. Second longitudinal ends 36, 38 oppose the first longitudinal ends 32, 34, and are adjacent one another on the support member 26 and are vertically spaced from one another. The second longitudinal ends 36, 38 are located across the middle portion of the back support assembly 24. The second ends 36, 38 are movable through variable distances away from the support member 26 to provide selective support to a user. The variable distance is accomplished by the clam-shell shape during expansion and retraction of the air bladders 28, 30.

Each of the air bladders 28, 30 include a transverse divider member 42, 44 establishing at least two horizontally located, or side-by-side, separate air sections 28a, 28b, 30a, 30b of the bladders 28, 30 for preventing air from passing between the separate air sections 28a, 28b, 30a, 30b through the divider members 42, 44. The transverse divider members 42, 44 are generally flexible membranes, and may be of the same material as the clam-shell air bladders 28, 30, such as rubber or nylon. The divider members 42, 44 are sealingly and fixedly connected within the air bladders 28, 30 to provide an air impervious divider. The divider members 40, 42 allow expansion and contraction of the air bladders 28, 30 in their original clam-shell shape, and are formed of the same configuration or shape as the sides 46, 48 of the bladders 28, 30. The divider members 40, 42 prevent the bladders 28, 30 from bowing in the center, similar to a football, which may create uneven support to the lumbar region.

Each of the sections 28a, 28b, 30a, 30b of the air bladders 28, 30 include a fluid port 50a, 50b, 52a, 52b connected through the support member 26 to each of the bladders 28, 30. The fluid ports 50, 52 provide access for the pressurized air to the air bladders 28, 30 to allow expansion and contraction thereof.

A controller 60 is connected to the air bladders 28, 30, and more particularly, each of the ports 50, 52 of the sections 28a, 28b, 30a, 30b to provide selective expansion and contraction thereof resulting in selective support to a user by the control of pressurized air. The controller 60 generally comprises an air pump 62 and a selection control circuit 66, as commonly known in the art, to allow the user to selectively control the support provided by the air bladders 28, 30. Such selection circuit 66 and overall controller 60 may be as used in other air bladder lumbar support systems, and may include user controlled switches to allow the user to increase or decrease support. The pump 62 is connected by a conduit 65 to the selection circuit 66. The selection circuit 66 is then connected by appropriate conduit or piping 64 to each of the fluid ports 50, 52.

As illustrated in FIG. 1, with the seat back assembly 24 connected within the seat back frame 18, a support plate 70 is positioned over the seat back support assembly 24 to provide semi-rigid support to a user in response to control of the bladders 28, 30. The support plate 70 comprises a generally rectangular flexible plate which is deformed in response to the expansion and contraction of the air bladders 28, 30. The plate 70 is larger than the expansion members 28, 30. The support plate 70 provides for semi-rigid support in the lumbar area. The support plate 70 includes a first and second ends 72, 74 spaced longitudinally from one another. The support plate 70 has a contour established by the air bladders 28, 30. The support plate 70 includes the first end 72 fixedly and pivotally connected to the seat back frame 18 at a cross bar 20a, while the second end 74 is freely movable and slidable along the seat back frame 18. The second end 74 of the support plate 70 is slidably supported within a slotted cross bar 20b of the seat back frame 18. The free end 74 is slid within the slot 75 of the cross bar 20b, and slides therein in response to expansion and contraction of the air bladders 28, 30. The support plate 70 is as that disclosed in U.S. Pat. No. 5,076,643 as discussed in the Background of the Invention and assigned to the assignee herein. This support plate 70 lies against the expansion members 28, 30 and directly responds to the movement forced by the expansion members 28, 30.

The support plate 70 may include a plurality of parallel slots 76 extending transverse to the longitudinal length of the plate 70 extending from the sides thereof parallel with the ends 72, 74. The slots 76 allow the lumbar portion of the plate 70 to be more flexible providing rigidity in the upper area of the plate 70, while allowing the lower end thereof to be flexible for contouring in the lumbar region. A center U-shaped cut out 78 is provided in the first end 72 and extends longitudinally inwardly to provide an opening in the occupant tailbone region and to allow tailbone biteline relief.

In operation, various contours of the support plate 70 may be acquired by adjustment of the air bladders 28, 30. By varying the amount of air pressure within each of the air bladders 28, 30, various lumbar support configurations may be obtained, as commonly known in the art. As can be appreciated by viewing FIG. 4, the bladders 28, 30 provide a substantially uniform upper, expansion surface 80 to uniformly deform the plate 70 preventing central bowing at only the center line thereof.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore to be understood that within the scope of the appended claims wherein reference numerals are merely for convenience and are not to be in any way limiting, the invention may be practiced otherwise than as specifically described.

What is claimed is:

1. A seat back support assembly (24) for selectively providing support to a user through a seat back portion (16) of a seat, said assembly comprising:

a support member (26) adapted to be connected to a seat back portion (16) of a seat (10);

a pair of vertically spaced expansion members (28, 30) secured to said support member (26);

at least one of said expansion members (28, 30) comprising a clam-shell shaped bladder for receiving and containing air, and including a first end (32, 34) connected to said support member (26) providing a hinge point and a second end (36, 38) vertically spaced from said first end (32, 34) and movable through a variable distance from said support member (26) to provide selective support to a user;

controller (60) connected to said expansion members (28, 30) to provide selective expansion of said expansion members (28, 30) to support to a user;

said assembly characterized by said bladder (28, 30) including a divider member (42, 44) establishing at least two, horizontally located, separate air sections (28a, 28b, 30a, 30b) of said bladder (28, 30) preventing air from passing between said separate air sections through said divider member (42, 44), said controller (60) connected to each of said separate air sections.

2. An assembly as set forth in claim 1 further characterized by the other of said expansion members (28, 30) comprising a second clam-shell shaped bladder.

3. An assembly as set forth in claim 2 further characterized by said second clam-shell shaped bladder including a second divider member (42, 44).

4. An assembly as set forth in claim 1 further characterized by each of said expansion means (28, 30) including a fluid port (50, 52) therein for receiving pressurized air from said controller (60), each of said separate air sections of said clam-shell shaped bladder including a fluid port (50, 52) therein.

5. An assembly as set forth in claim 1 further characterized by including a flexible plate (70) connected over said air bladders (28, 30) for deforming in response to expansion of said bladders (28, 30) to provide support to a user.

6. A seating assembly (10) including a seat back portion (16) and seating portion (14), and assembly comprising:

a seat back portion (16);

said seat back portion including a seat frame (18) and a cushion (12) supported by said seat frame (18);

a support member (26) connected to said frame (18), a pair of vertically spaced expansion members (28, 30) secured to said support member (26);

at least one of said expanding members (28, 30) comprising a clam-shell shaped bladder for receiving and containing air, and including a first end (32, 34) connected to said support member (26) providing a hinge point and a second end (36, 38) vertically spaced from said first end (32, 34) and movable through a variable distance from said support member (26) to provide selective support to a user;

controller (60) connected to said expansion members (28, 30) to provide selective expansion of said expansion members (28, 30) to support to a user;

said assembly characterized by said bladder (28, 30) including a divider member (42, 44) establishing at least two, horizontally located, separate air sections (28*a*, 28*b*, 30*a*, 30*b*) of said bladder (28, 30) preventing air from passing between said separate air sections through said divider member (42, 44), said controller (60) connected to each of said separate air sections.

\* \* \* \* \*